(12) United States Patent
Sung

(10) Patent No.: US 7,669,825 B2
(45) Date of Patent: Mar. 2, 2010

(54) SEAT SLIDING APPARATUS FOR VEHICLES

(75) Inventor: Yong Bok Sung, Hwaseong-si (KR)

(73) Assignee: Kia Motors Corporation, Seoul (KR)

( * ) Notice: Subject to any disclaimer, the term of this patent is extended or adjusted under 35 U.S.C. 154(b) by 181 days.

(21) Appl. No.: 11/299,369

(22) Filed: Dec. 8, 2005

(65) Prior Publication Data

US 2007/0090262 A1 Apr. 26, 2007

(30) Foreign Application Priority Data

Oct. 26, 2005 (KR) ................... 10-2005-0101194

(51) Int. Cl.
*F16M 13/00* (2006.01)
(52) U.S. Cl. .................. 248/429; 248/424; 248/430; 297/344.11; 296/65.13; 296/65.14
(58) Field of Classification Search ........... 248/424, 248/429, 430; 297/344.11; 296/65.13, 65.14
See application file for complete search history.

(56) References Cited

U.S. PATENT DOCUMENTS 5,918,846 A * 7/1999 Garrido ................. 248/429
6,227,596 B1 * 5/2001 Foucault et al. ......... 296/65.13
6,354,553 B1 * 3/2002 Lagerweij et al. ........... 248/430
6,616,233 B1 * 9/2003 Debus et al. ................. 297/341
6,631,879 B2 * 10/2003 Hibino et al. ............... 248/429
6,874,747 B2 * 4/2005 Oh ............................. 248/430
7,191,995 B2 * 3/2007 Kim ........................... 248/429
2006/0261237 A1 * 11/2006 Noffz ......................... 248/424

* cited by examiner

*Primary Examiner*—J. Allen Shriver, II
*Assistant Examiner*—Nkeisha J Smith
(74) *Attorney, Agent, or Firm*—Morgan, Lewis & Bockius LLP

(57) ABSTRACT

A seat sliding apparatus for vehicles is provided. The seat sliding apparatus includes a track and a guide bracket with legs connected to stepped locking pins to regulate the locked state of the locking pins which engage the track. In one embodiment, the track includes through-holes which are engaged by the locking pins. Accordingly to another aspect of the apparatus, a plastic bushing is provided to prevent horizontal/vertical floating of the locking pins, thereby minimizing the play of the locking pins and prevent floating. The apparatus also may simultaneously prevent a half-locked state of the locking pins.

16 Claims, 4 Drawing Sheets

SEAT SLIDING APPARATUS FOR VEHICLES

CROSS-REFERENCE TO RELATED APPLICATION

This application claims priority to and the benefit of Korean Patent Application 10-2005-0101194 filed in the Korean Intellectual Property Office on Oct. 26, 2005, the entire content of which is incorporated herein by reference.

FIELD OF THE INVENTION

The present invention relates generally to a seat sliding apparatus for vehicles, and more particularly to a seat sliding apparatus that prevents a half-locked state of the seat to a seat track that may be caused by the play of locking pins.

DESCRIPTION OF THE RELATED ART

In a vehicle, the front driver and passenger seats are generally movable in a forward or backward direction to allow the driver or passenger to sit in a particular position. In order to move the seat in a forward or backward direction, a user raises a lever upward causing locking pins to escape from slots in a seat track and releasing the locked state thus enabling the seat to move.

SUMMARY OF THE INVENTION

In one embodiment, the present invention provides a seat sliding apparatus for vehicles in which a guide bracket is connected to stepped locking pins such that when any one of four locking pins is not locked, the steps of the locking pins push against arms of the guide bracket to prevent engagement of the locking pins with the track. In another embodiment, a clamping bushing is mounted in a transfer rail so as to allow the locking pins to be firmly positioned, thereby preventing horizontal/vertical floating of the locking pins as well as minimizing the play of the locking pins.

In one embodiment, the apparatus includes a lever operable to move upward and downward to facilitate a seat to move in a forward or backward direction; a connecting bar hinged to a seat fixture to promote the upward and downward operation of the lever; a guide bracket pivoting according to operation of the lever and the connecting bar; locking pins inserted and extracted into and from through-holes of a track by the pivoting action of the guide bracket; and a supporting member mounted to a transfer rail, the support member comprising a hinge pin that supports the guide bracket and also having through-holes for the locking pins.

In one aspect, the present invention is directed to a seat sliding apparatus for vehicles, comprising a lever operable to move upward and downward to facilitate a seat moving forward and backward directions, a connecting bar hinged to a fixture to promote the upward and downward operation of the lever, a guide bracket pivoting in response to operation of the lever and the connecting bar, a plurality of locking pins inserted into and extracted from a plurality of first through-holes on a track by the pivoting of the guide bracket, wherein the plurality of locking pins are inserted into the through-holes in unison, and a supporting member mounted to a transfer rail and pivotably supporting the guide bracket using a hinge pin, said supporting member comprising a plurality of second through-holes for the operation of the locking pins.

In other aspects, one of the plurality of locking pins being unable to enter a through-hole prevents the remaining locking pins from entering through-holes; the lever is coupled with the guide bracket by a connecting piece; the connecting piece is provided with a receiving recess for connecting the lever; the connecting bar is mounted with one or more torsion springs for promoting upward and downward operation; the guide bracket is provided with a plurality of legs spaced apart from each other and which support the locking pins; the plurality of legs comprise first legs of a linear shape and second legs whose middle portions are bent in a semi-circular shape, alternating with each other; each of the plurality of locking pins comprises a first projection and a second projection, wherein the space between the first and second projections defines a space capable of receiving the second legs; each of the plurality of locking pins is connected to a spring adapted to insert the locking pin into a through-hole, said spring being installed between the second projection and the supporting member; the apparatus further comprises a clamping bushing to prevent floating of any of the plurality of locking pins; the clamping bushing comprises third through-holes through which the locking pins pass, said clamping bushing located between the track and the guide bracket; the clamping bushing is held in place with a plurality of locking members; and the clamping bushing is formed of plastic.

DESCRIPTION OF THE DRAWINGS

The above and other objectives, features and advantages of the present invention will be more apparent from the following detailed description taken in conjunction with the accompanying drawings, in which.

DETAILED DESCRIPTION OF THE PREFERRED EMBODIMENTS

Figure 1:
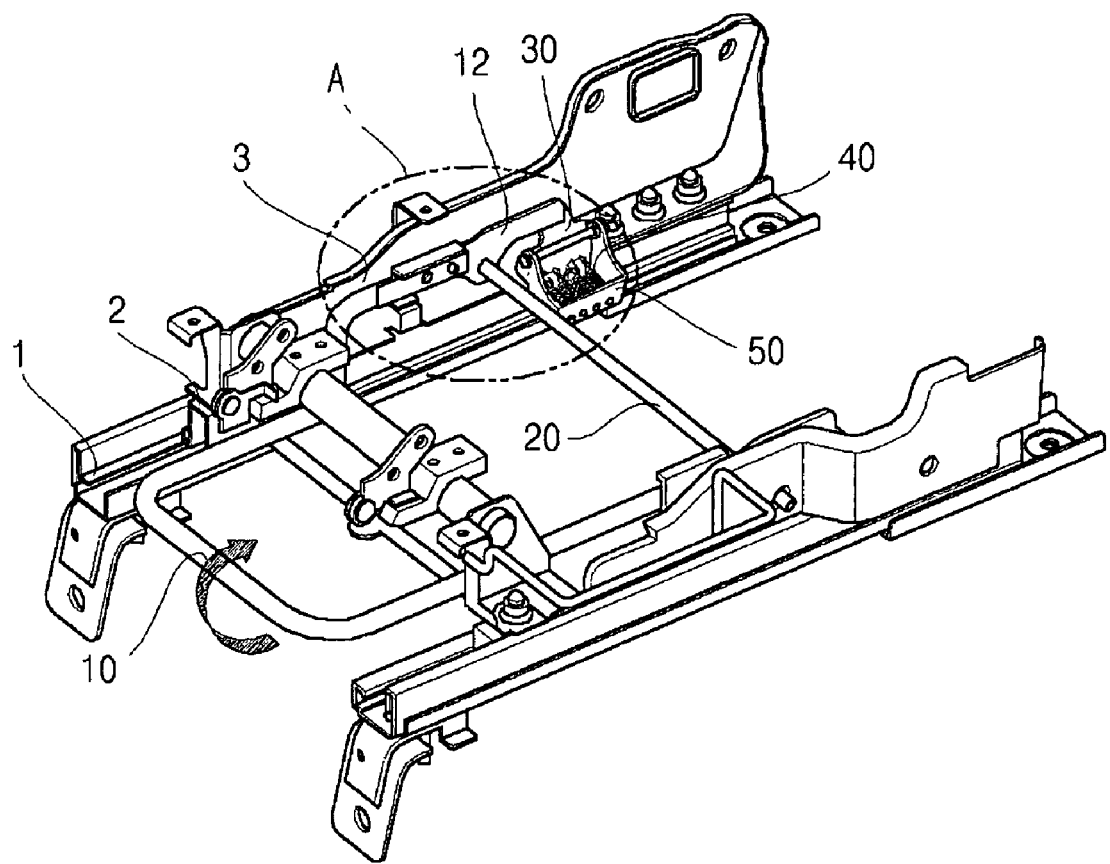
FIG. 1 is a perspective view illustrating an embodiment of the disclosed seat sliding apparatus.
Figure 2:
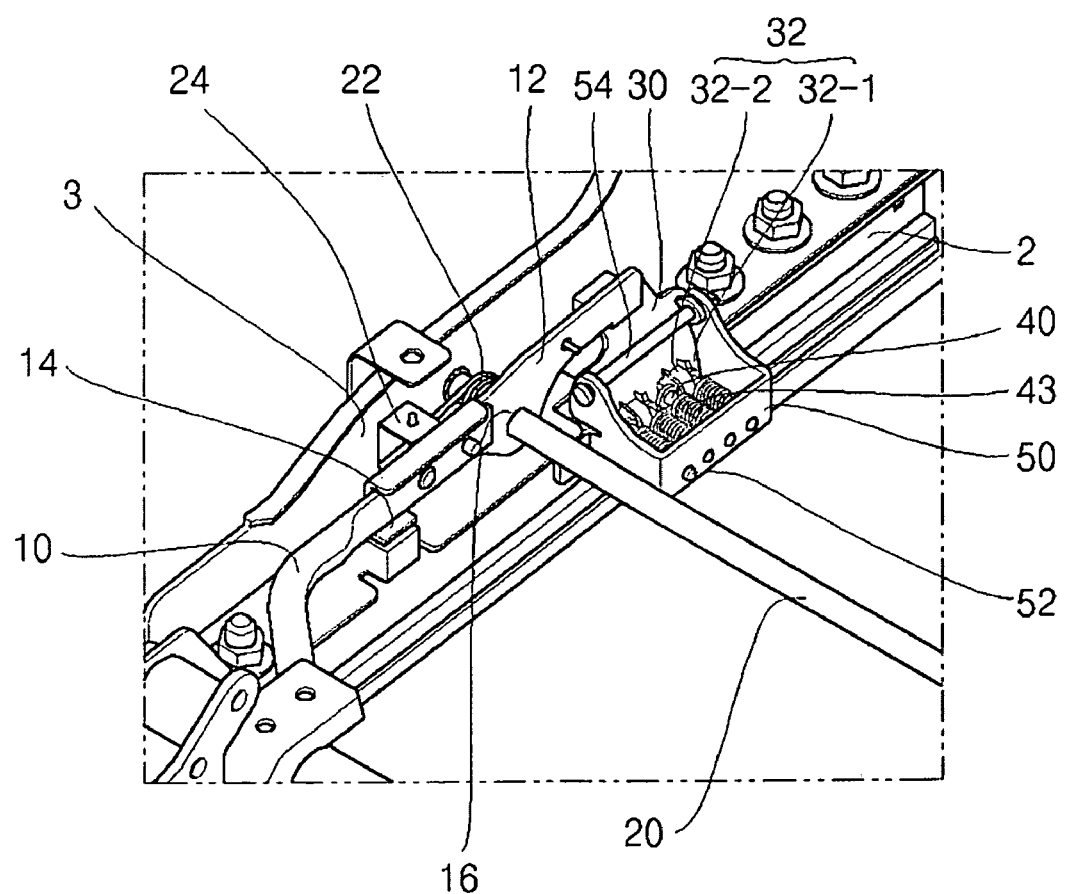
FIG. 2 is a magnified perspective view of portion A as shown in FIG. 1.

In the Figures and the following description the same reference numerals are used to designate the same or similar components. As shown in FIGS. 1 and 2, a seat sliding apparatus is comprised of lever 10, connecting bar 20, guide bracket 30, locking pin 40, supporting member 50, and clamping bushing 60. Lever 10 is operable to move upward and downward, and is adapted to press on guide bracket 30 to move locking pins 40 to in horizontal (i.e., leftward and rightward) directions. When the locking pins are released, the seat is free to move in the forward and backward directions, and when the locking pins are engaged, the seat is locked in a particular position on track 1.

In one embodiment, lever 10 is connected to connecting bar 20 and also to guide bracket 30. In another embodiment, connecting piece 12 is provided with a receiving recess 14 in which the lever 10 is rested and coupled, and a hole 16 for coupling connecting bar 20 to connecting piece 12. As will be recognized, receiving recess 14 facilitates operation of the lever 10 after coupling, and as shown by the arrow in FIG. 1, lever 10 is operable to move upward and downward. In various embodiments, lever 10 may be coupled with guide bracket 30 by connecting piece 12; connecting piece 12 may be provided with receiving recess 14 for resting and fitting lever 10 on one side thereof; and connecting bar 12 may be mounted with torsion springs 22 for promoting upward and downward operation.

As shown, connecting bar 20 passes through hole 16 of connecting piece 12 and connects to fixture 3 facilitating the upward and downward operation of the lever 10. In one embodiment, and as shown in FIG. 2, connecting bar 20 is mounted with torsion springs 22 for promoting upward and downward operation. Torsion springs 22 are preferably supported by supporting pieces 24 mounted to fixture 3.

In one embodiment, guide bracket 30 pivots according to the operation of lever 10. For example, the upward movement of lever 10 causes a downward movement of connecting piece 12, which in turn pushes down on guide bracket 30 causing the guide bracket to pivot and push locking pins 40 from the engaged (locked) position. The downward movement of level 10 allows the locking pins to be inserted into through-holes formed in the track 1. In one embodiment, guide bracket 30 is coupled with a supporting member 50 by means of a hinge pin 54, and thus pivots up and down about hinge pin 54.

Figure 3:
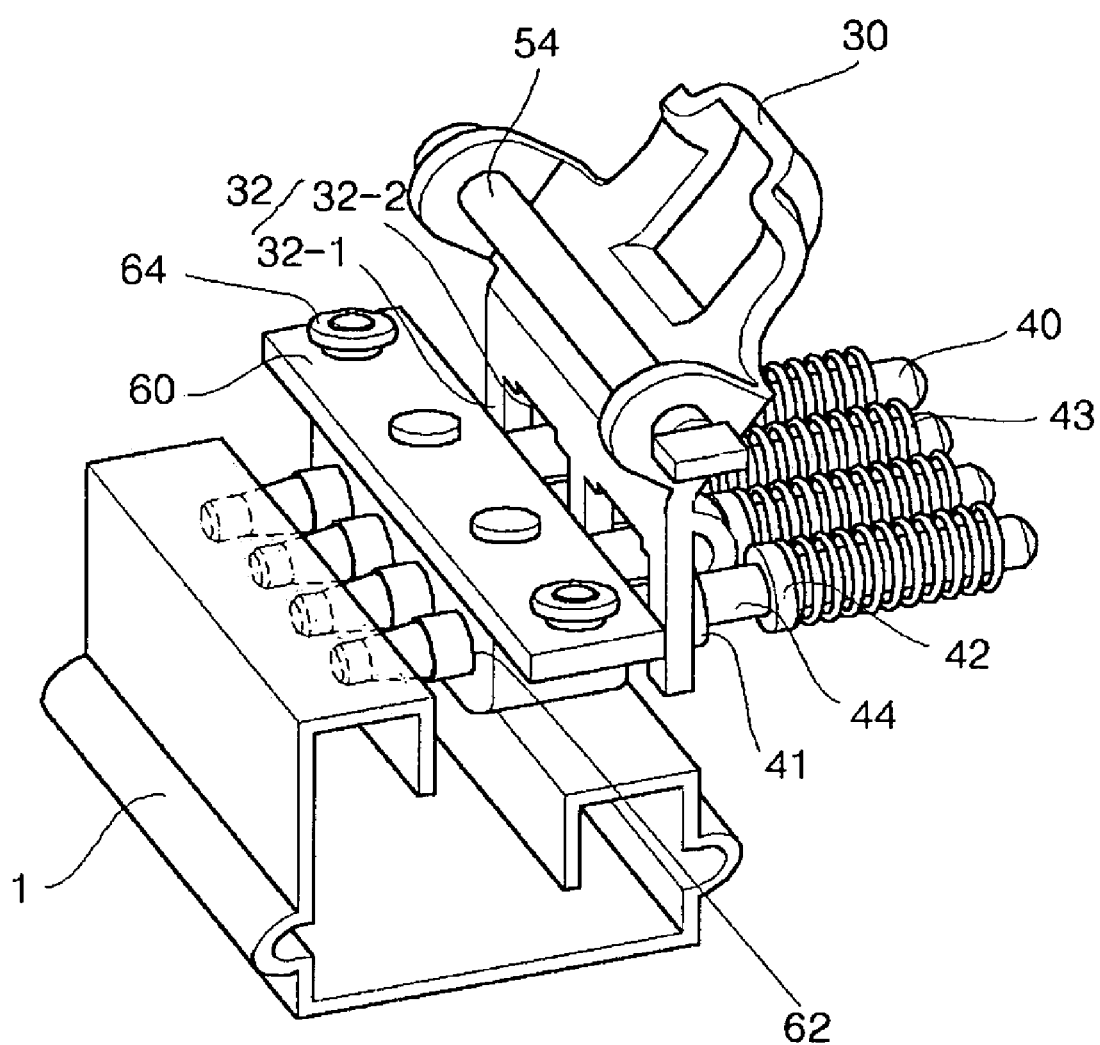
FIG. 3 is a perspective view showing a seat sliding apparatus with a clamping bushing mounted.
Figure 4:
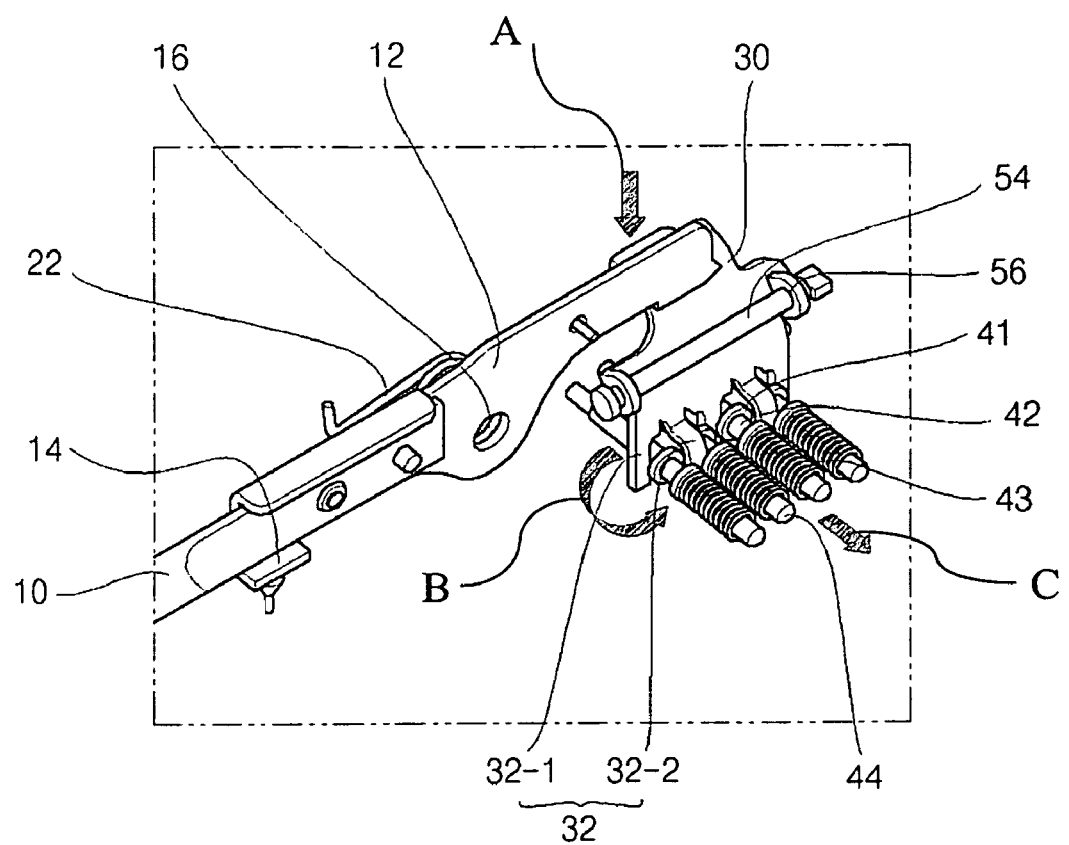
FIG. 4 is a perspective view illustrating an embodiment of the disclosed seat sliding apparatus.

In one embodiment, guide bracket 30 comprises a plurality of legs 32 which are spaced apart from each other and also support locking pins 40. In one embodiment, and as shown in FIGS. 3 and 4, legs 32 are comprised of first legs 32-1 (in a linear shape) and second legs 32-2 (in a semi-circular shape). As will be recognized, the first legs 32-1 and second legs 32-2 can alternate with each other in shape and location. As shown in FIG. 2, each of the first legs 32-1 is located outside the first projection 41 of each locking pin 40, and each of the second legs 32-2 is located within the space 44 defined between the first projection 41 and the second projection 42. In one embodiment, the legs 32 support the locking pins 40 and simultaneously allow the locking pins 40 to move in the leftward and rightward (horizontal) directions.

In one embodiment, locking pins 40 may be provided with a first projection 41 formed between the first and second legs 32-1 and 32-2, and a second projection 42 formed apart from the first projection 41 at a predetermined interval, in order to define a space 44 in which the second leg 32-2 is received. Locking pins 40 are preferably fixed so as not to escape from the legs 32. In this and other embodiments, if any of the locking pins is not positioned to be inserted into through-holes in track 1, first legs 32-1 and/or second legs 32-2 press against first projection 41 and/or second projection 42 (respectively) to prevent any of the locking pins from inserting into through-holes in track 1. Accordingly, all locking pins 40 must be aligned with a through-hole to lock the pins to track 1. This ensures that the strength of all locking pins contribute to holding the seat in the track in the event of a collision. As will be recognized, although the number of the locking pins 40 is shown as four, any number of locking pins may be used.

As shown in the Figures, a spring 43 promoting restoration of each locking pin 40 is installed between the second projection 42 and the supporting member 50. The springs 43 preferably allow the locking pins 40 to be extracted from the through-holes formed on track 1 so as to be able to move a seat, and when the seat moves to a proper position, and lever 10 is moved downward, springs 43 cause the locking pins 40 to be inserted into through-holes in the track 1. Supporting member 50 preferably comprises a plurality of holes 56 into which a hinge pin 54 can be fitted to support guide bracket 30, second through-holes 52 (corresponding to the number of locking pins 40). Further, supporting member 50 is preferably mounted to transfer rail 2.

In one embodiment, supporting member 50, in conjunction with hinge pin 54, pivotably supports the guide bracket 30, and allows locking pins 40 to be extracted from the through-holes in the track 1. In this and other embodiments, when locking pins 40 are extracted from the through-holes in track 1, the locking pins may pass through second through-holes 52 in supporting member 50.

In another embodiment, and as shown in FIG. 3, locking pins 40 are mounted to clamping bushing 60 prevent floating of the locking pins. Clamping bushing 60 is preferably is formed with third through-holes 62 through which the locking pins 40 pass. Further, clamping bushing 60 is preferably installed between track 1 guide bracket 30. In one embodiment, clamping bushing 60 is provided with locking members 64 to prevent separation of locking pins 40 which may pass through third through-holes 62. In another embodiment, clamping bushing 60 is formed of plastic.

FIG. 4 is a perspective view illustrating an embodiment of the disclosed seat sliding apparatus. When an occupant of a vehicle raises lever 10 upward as shown in FIG. 1, the upward movement of lever 10 causes guide bracket 30 to pivot around the axis created by hinge pin 54. As shown in FIG. 4, when connecting piece 12 moves downward (arrow A of FIG. 4), guide bracket 30 pivots and legs 32 move (arrow B of FIG. 4) to disengage the locking pins from track 1, and release the locked state (arrow C of FIG. 4). In one embodiment, when the locking pins 40 are released from the locked state, the occupant moves the seat along the track 1 in a forward or backward direction.

When the seat moves to desired position, the occupant lowers the lever 10 downward, elastic springs 43 force locking pins 40 into the through-holes of the track 1 re-engaging the locking position. In one embodiment, since guide bracket 30 comprises legs 32, and locking pins 40 each comprise first projections 41 and second projections 42, the locking mechanism only functions when all of the locking pins can be inserted into through-holes in track 1. I.e., where one or more locking pins has no corresponding through-hole, the first and second projections (41 and 42 respectively)—which are connected to legs 32 of guide bracket 30, will prevent any remaining locking pins entering through-holes in track 1.

In other embodiments, the size of the locking pins is sufficient so as to meet safety standards for seat sliding mechanisms; the locking pins can only lock in unison, and where one locking pins cannot lock, the remaining pins are prevented from being locked as well; clamping bushing 60 supports locking pins preventing (1) a half-locked state, (2) play of the locking pins, (3) noise caused by the floating of the locking pins.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A seat sliding apparatus for vehicles, comprising:
    a lever operable to facilitate a seat moving in forward and backward directions on a track wherein the track defines a plurality of first through-holes;
    a connecting bar pivotally supporting the lever on a fixture to permit operation of the lever;
    a guide bracket pivoting upward or downward in response to operation of the lever;
    a plurality of locking pins inserted into or extracted from said plurality of first through-holes by the pivoting of the guide bracket, wherein said guide bracket and pins are operatively engaged for movement in unison in inward and outward directions such that if one of the plurality of locking pins is unable to enter a first through-hole, said operative engagement prevents the remaining locking pins from entering the plurality of first through-holes; and a supporting member mounted to a transfer rail attached on lower portion of the fixture and pivotally supporting the guide bracket using a hinge pin, said supporting member defining a plurality of second through-holes for the operation of the locking pins, wherein the guide bracket is provided with a plurality of legs spaced apart from each other and engaging the locking pins, wherein the plurality of legs comprise first legs of a linear shape and second legs whose middle portions are bent in a semi-circular shape and lower portions are spaced out of plane from the first legs, alternating with each other, and wherein each of the plurality of locking pins comprises a first projection and a second projection, wherein the first projection and second projection define therebetween a space capable of receiving the second legs, and thereby providing said operative engagement.

2. The apparatus of claim 1, wherein the lever is operatively coupled with the guide bracket by a connecting piece attached to a distal end of the lever.

3. The apparatus of claim 2, wherein the connecting piece is provided with a receiving recess for connecting the distal end of the lever.

4. The apparatus of claim 1, wherein the connecting bar is mounted with at least one torsion spring for promoting upward and downward operation.

5. The apparatus of claim 1, wherein each of the plurality of locking pins is acted on by a spring adapted to bias the locking pin into a respective first through-hole, said spring being installed between the second projection and the supporting member.

6. The apparatus of claim 1, further comprising a clamping bushing to prevent floating of any of the plurality of locking pins.

7. The apparatus of claim 6, wherein the clamping bushing comprises third through-holes through which the locking pins pass, said clamping bushing located between the track and the guide bracket.

8. The apparatus of claim 6, wherein the clamping bushing is held in place with a plurality of locking members.

9. The apparatus of claim 6, wherein the clamping bushing is formed of plastic.

10. A seat sliding apparatus for vehicles, comprising:
a lever pivotally supported by a fixture, operable to facilitate a seat moving in forward and backward directions on a track, wherein the track defines a plurality of first through-holes;

a guide bracket pivoting upward or downward in response to operation of the lever, the guide bracket comprising a plurality of first and second legs spaced apart from each other, alternating with each other and extending in different planes from each other; and a plurality of locking pins receivable in said plurality of first through-holes in response to pivoting of the guide bracket, each of the locking pins having a first projection spaced from a second projection, wherein the first leg acts against an outside of the first projection, and the second leg acts between said first and second projections to block pivoting of said guide bracket when at least one said locking pin is prevented from being received in its respective first through-hole, whereby remaining locking pins are prevented from entering the corresponding first through-holes.

11. The apparatus of claim 10, further comprising a supporting member mounted to a transfer rail attached on a lower portion of the fixture and pivotably supporting the guide bracket using a hinge pin, said supporting member defining a plurality of second through-holes for the operation of the locking pins.

12. The apparatus of claim 10, wherein the lever is operatively coupled with the guide bracket by a connecting piece attached to an end of the lever.

13. The apparatus of claim 11, wherein each of the plurality of locking pins is activated by a spring adapted to bias the locking pin into a respective first through-hole, said spring being installed between the second projection and the supporting member.

14. The apparatus of claim 10, further comprising a clamping bushing to prevent floating of any of the plurality of locking pins, wherein the clamping bushing comprises third through-holes through which the locking pins pass, said clamping bushing located between the track and the guide bracket.

15. The apparatus of claim 10, wherein at least one said guide bracket second leg bears against a corresponding locking pin first projection to prevent pivoting of the guide bracket when said locking pin is blocked from entering the corresponding first through-hole.

16. The apparatus of claim 15, wherein said guide bracket first legs act against the outside of said locking pin first projections to prevent entry into said first through-holes when pivoting of the guide bracket is prevented.

\* \* \* \* \*